United States Patent
Wakeman et al.

(10) Patent No.: US 9,937,657 B2
(45) Date of Patent: Apr. 10, 2018

(54) COMPOSITE ARTICLE MADE WITH UNIDIRECTIONAL FIBRE REINFORCED TAPE

(71) Applicant: E I DU PONT DE NEMOURS AND COMPANY, Wilmington, DE (US)

(72) Inventors: Martyn Douglas Wakeman, Gland (CH); Craig Norrey, Puplinge (CH)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 289 days.

(21) Appl. No.: 14/724,880

(22) Filed: May 29, 2015

(65) Prior Publication Data

US 2016/0046066 A1    Feb. 18, 2016

Related U.S. Application Data (62) Division of application No. 13/692,054, filed on Dec. 3, 2012, now abandoned.

(60) Provisional application No. 61/567,801, filed on Dec. 7, 2011.

(51) Int. Cl.
| | | |
|---|---|---|
| B29C 65/02 | (2006.01) |
| B29C 53/56 | (2006.01) |
| B32B 5/28 | (2006.01) |
| B29C 65/08 | (2006.01) |
| B29C 65/14 | (2006.01) |
| B29C 65/00 | (2006.01) |
| F16C 7/02 | (2006.01) |
| B29C 70/38 | (2006.01) |
| B29L 31/06 | (2006.01) |
| B29C 65/10 | (2006.01) |
| B29C 65/18 | (2006.01) |
| B29B 11/16 | (2006.01) |
| B29C 65/78 | (2006.01) |

(52) U.S. Cl.
CPC .............. *B29C 65/02* (2013.01); *B29C 53/56* (2013.01); *B29C 53/562* (2013.01); *B29C 65/08* (2013.01); *B29C 65/14* (2013.01); *B29C 66/1122* (2013.01); *B29C 66/7212* (2013.01); *B29C 70/386* (2013.01); *B32B 5/28* (2013.01); *F16C 7/026* (2013.01); *B29B 11/16* (2013.01); *B29C 65/10* (2013.01); *B29C 65/1412* (2013.01); *B29C 65/1448* (2013.01); *B29C 65/1464* (2013.01); *B29C 65/18* (2013.01); *B29C 65/7841* (2013.01); *B29C 65/7855* (2013.01); *B29C 66/0242* (2013.01); *B29C 66/21* (2013.01); *B29C 66/4322* (2013.01); *B29C 66/4324* (2013.01); *B29C 66/49* (2013.01); *B29C 66/71* (2013.01); *B29C 66/72141* (2013.01); *B29L 2031/06* (2013.01); *Y10T 428/24132* (2015.01)

(58) Field of Classification Search
CPC ........ B29C 65/02; B29C 53/56; B29C 53/562
USPC .................................................... 156/73.1
See application file for complete search history.

(56) References Cited

U.S. PATENT DOCUMENTS

| | | | | |
|---|---|---|---|---|
| 4,081,302 A * | 3/1978 | Drostholm | ............... | B29C 53/74 138/129 |
| 2009/0236091 A1* | 9/2009 | Hammami | .......... | B29C 53/8016 166/242.1 |

* cited by examiner

Primary Examiner — Brent T O'Hern (57) ABSTRACT

Disclosed is a method of forming an article from a unidirectional (UD) tape comprising a continuous unidirectional fiber impregnated with polymer resin. The method includes winding a continuous section of cold UD tape to form a closed loop preform (38) comprising a plurality of stacked layers while discretely welding and consolidating the wound preform by heating and applying pressure.

18 Claims, 13 Drawing Sheets

COMPOSITE ARTICLE MADE WITH UNIDIRECTIONAL FIBRE REINFORCED TAPE

CROSS REFERENCE TO RELATED APPLICATIONS

This application is a divisional of U.S. application Ser. No. 13/692,054, now pending, which claims the benefit of U.S. Provisional Application No. 61/567,801, filed Dec. 7, 2011, the entire disclosure of which is incorporated herein by reference.

FIELD OF THE INVENTION

The present invention relates to a method of forming a composite article from unidirectional fibre reinforced tape.

BACKGROUND OF THE INVENTION

Unidirectional tape is commonly understood to be a thin strip or band of continuous unidirectional fibres (for instance glass fibres, carbon fibres, or other known reinforcing fibres) impregnated with a polymer resin. The tape may typically have a width in the order of magnitude of 1 to 15 cm wide, perhaps wider, and a thickness of less than 1 mm, such that the tape may be provided on a reel.

In a conventional process, it is known to form a composite article with a loop-shaped fibre reinforcement by winding unidirectional fibre reinforced tape around a shape-forming element, the tape being heated as it is wound to soften the polymer resin such that the layers of tape bind together and follow the contour of the shape-forming element. The heating and subsequent cooling process is time-consuming and occupies the tape winding and forming machine, thus resulting in a costly manufacturing process.

It is also known to form articles with fibre-reinforced polymer resins provided in sheets or wound tape by cutting sections of tape and two-dimensional shaped blanks out of sheets and stacking them together in a cold state as described in U.S. Pat. No. 5,394,773. The stacked sheets are then placed in a die and subsequently subjected to heat and pressure to soften and bind the polymer resin of the stacked sheets and layers together. One of the drawbacks of the latter process is the difficulty of properly holding and positioning the assembled layers together, especially when transporting the assembly from one manufacturing station to another. Also, for articles that are intended to support high tensile (traction) or bending forces, conventional cold UD tape stacking and forming processes are not well adapted to form complex shapes with optimal tensile resistance properties, as compared to the hot forming process described above.

SUMMARY OF THE INVENTION

It is an object of the invention to provide a method of forming an article from or with unidirectional tape that is economical for large series production and that enables production of an article that can withstand high loads.

In certain applications, it is advantageous to provide a method of forming an article from or with unidirectional tape that has a high tensile strength to sustain high loads, in particular traction, bending, or torsional forces applied on the article.

It is advantageous to provide a method of forming a composite article with a high strength to weight ratio.

It is advantageous to provide a method of forming an article from or with unidirectional tape that is economical yet enables the forming of articles with complex shapes, or with a complex stress distribution.

It is advantageous to provide a method of forming an article with unidirectional fibre reinforced tape that is accurate, reliable, and reproducible with a low variation in manufacturing tolerances.

Objects of this invention have been achieved by providing the method of forming an article according to claim 1.

Disclosed herein is a method of forming an article from a unidirectional (UD) tape comprising a continuous unidirectional fibre impregnated with polymer resin, the method including:
  winding a continuous section of cold said UD tape to form a closed loop wound UD tape preform comprising a plurality of stacked layers of said continuous section of cold UD tape;
  during winding, fixing directly together in at least one discrete (local) position at least two adjacent stacked layers;
  at least at or near an end of the winding and optionally at one or more other levels of the plurality of stacked layers; and
  consolidating the wound UD tape preform.

In a preferred embodiment, said fixing of at least two adjacent layers together consists of welding the at least two adjacent layers together. In a variant, fixing may include adhesive bonding or mechanical stapling together of the adjacent layers.

Consolidation of the UD tape preform may be done by heating and applying pressure to consolidate the plurality of stacked tape layers in a compression die. In a variant, consolidation may be done by preheating the UD tape preform and then directly overmolding the preheated UD tape preform in an injection die.

During winding, one may advantageously further discretely weld at least two of the stacked layers of UD tape together at or near a beginning of the winding, and at further positions between the stacked layers of UD tape. In an advantageous variant, the process includes discretely welding most or all of the stacked layers of UD tape. The discrete welding may be at different positions along the closed loop. The discrete welding may advantageously include welding by ultrasonic or inductive means.

The tape may advantageously be wound around a jig comprising a channel to guide the tape. The jig may comprise at least two separable parts configured to allow the UD tape preform to be removed from the jig after winding. The jig may comprise top active location pins that press the tape down against the jig and/or side active location pins that displace the tape laterally in a direction essentially parallel to a plane of the tape. In a variant, the tape may be wound in a manner to offset laterally certain sections of tape with respect to an underlying section of tape.

In an advantageous embodiment, the tape is made from sheets of unidirectional fibre impregnated with polymer resin having a thickness between 0.1 and 0.5 mm, and cut in the direction of the fibre to widths of tape of 0.5 to 15 cm width. The tape may be stored in a roll and fed from the roll during the winding process. In an advantageous embodiment, the winding may form a plurality of stacked layers in the range of 3 to 100 layers.

After winding, the consolidation may advantageously comprise heating the UD tape preform in a heating station to a resin melt temperature enabling consolidation, and subsequently transferring the heated UD tape preform to a compression mold die to apply pressure. The compression mold die comprises a lower die comprising a die cavity for receiving the UD tape preform therein, and an upper die to close the die during compression. In a first embodiment, the lower die comprises lateral active cores configured to compress the UD tape preform in a direction essentially parallel to the stacking direction of layers. In another embodiment, the compression mold die comprises a lower die comprising a die cavity for receiving the UD tape preform therein, and an upper die comprising an active core, the upper die configured to compress the UD tape preform in a direction essentially orthogonal to the stacking direction of the layers. The use of the terms "lower" and "upper" in relation to the dies is not intended to represent any particular spatial arrangement other than to distinguish one die with respect to the other complementary die. With respect to the direction of gravitational force, the dies may be arranged horizontally, vertically, at any angle therebetween, and the functions of the "lower" and "upper" dies as described above may be inverted.

The method of forming a composite article according to this invention may further comprise overmolding at least a portion of the consolidated UD tape preform after consolidation.

The tape winding process may include winding UD tape at least partially around an insert to be integrated in the composite article.

Also disclosed herein is a composite article comprising a closed loop consolidated wound UD tape preform formed by a method as described herein.

The fibre may include glass fibre, carbon fibre, aramid fibers, metal fibers, ceramic fibers, natural fibers or mixtures thereof; more preferably, the fibrous material is made of glass fibers, carbon fibers, aramid fibers, natural fibers or mixtures thereof; and still more preferably, the fibrous material is made of glass fibers, carbon fibers and aramid fibers or mixture mixtures thereof. More than one fibrous materials can be used. The fibrous materials can be optionally stretch-broken. A combination of fibrous materials made of different fibers can be used such as for example a UD tape structure comprising one or more central layers made of glass fibers or natural fibers and one or more surface layers made of carbon fibers or glass fibers.

The UD tape material may be a mixture of a thermoplastic material and the fibrous materials described above, for example the fibrous material may be in the form of commingled or co-woven yarns or a fibrous material impregnated with a powder made of the thermoplastic material, a tape made by melt impregnating thermoplastic material into the fibrous material optionally using a die, or a monomer or partially polymerized monomer that can be reacted into a thermoplastic material that is suited to subsequent processing into UD tape forms, or any mixture of fibrous material and thermoplastic material for use as a uni-directional material.

Preferably, the ratio between the fibrous material and the polymer materials, i.e. the thermoplastic material, is at least 15% and more preferably between 40 and 70%, the percentage being a volume-percentage based on the total volume of the composite structure.

The thermoplastic material comprises one or more thermoplastic materials including but not limited to polypropylene, polyamide, thermoplastic polyesters including polybutylene terephthalate, polyethylene terephthalate, thermoplastic elastomers and polyphenylene sulfide.

Preferably, the thermoplastic material comprises one or more polyamides. Polyamides are condensation products of one or more dicarboxylic acids and one or more diamines, and/or one or more aminocarboxylic acids, and/or ring-opening polymerization products of one or more cyclic lactams. The one or more polyamides are independently selected from fully aliphatic polyamide resins, semi-aromatic polyamide resins and mixtures thereof.

Further objects and advantageous aspects of the invention will be apparent from the claims, and from the following detailed description and accompanying figures.

BRIEF DESCRIPTION OF THE DRAWINGS

FIG. 2b is a schematic view of a part of a guide channel of the jig of FIG. 2a;

FIG. 3d is a schematic perspective view of the partially formed article of FIG. 3a;

FIG. 8b and FIG. 8c are cross-sectional views through two orthogonal planes of the composite article of FIG. 8a.

DETAILED DESCRIPTION OF EMBODIMENTS OF THE INVENTION

Figure 8A:
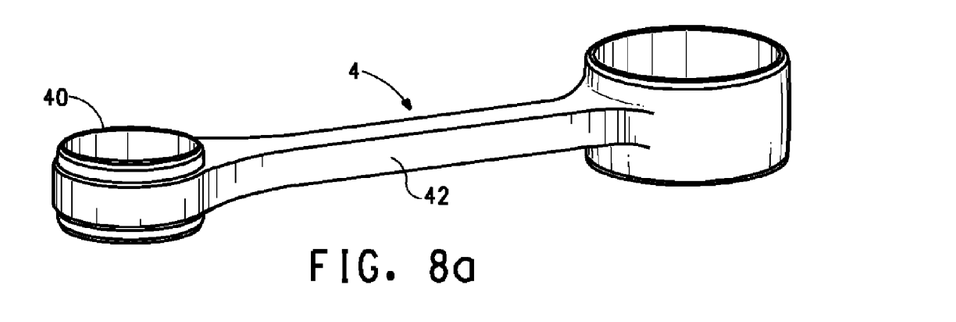
FIG. 8a is a view in perspective of an example of a composite article according to an embodiment of this invention.
Figure 8B:
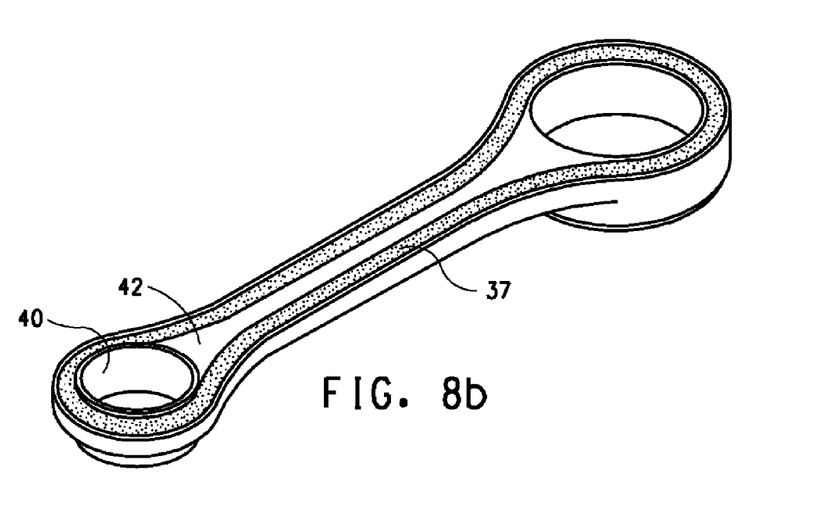
Figure 8C:
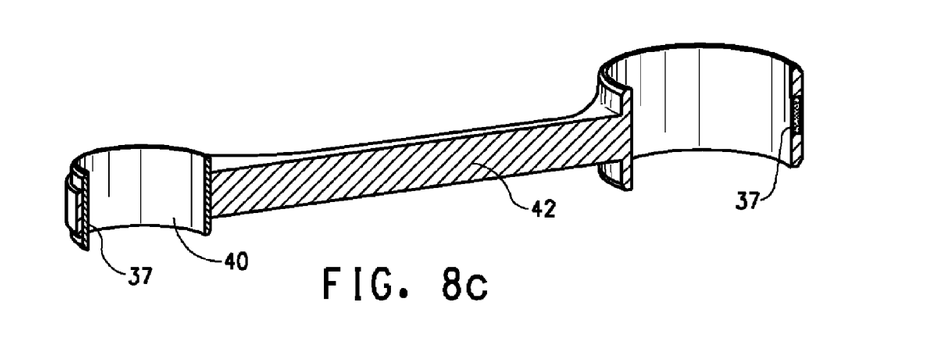

Referring to FIGS. 8a to 8c, an example of a composite article 4 is shown, the article in this example representing a vehicle suspension arm or control rod. The article comprises a consolidated fibre reinforced part 37 forming a closed loop, an overmolding 42 and optionally one or more inserts 40. The consolidated fibre reinforced part 37 is made from a wound unidirectional tape preform 38 made using a process according to embodiments of the invention that are described further on. Composite articles according to the invention may be formed uniquely from unidirectional tape, or from a unidirectional tape combined with inserts, overmolding, and other elements mounted to or around the wound UD tape preform. In the illustrated example of FIGS. 8a to 8c, the overmolding 42 may for example be an injected polymer, and the one or more inserts could be made of various materials, for example an insert made of a metal, composite material, or of a ceramic, depending on the application and the function to be accomplished. The closed loop fibre reinforcement 37 of the article provides structural strength to the article, especially against tensile forces $F_t$ or beam bending stresses, or other stress components depending on the forces to be supported by the article and the geometry and spatial orientation of the article. In the present invention, the unidirectional fibres extend in a continuous, substantially uninterrupted manner multiple times around the closed loop to provide very high strength against tensile forces acting in the loop.

Figure 1A:
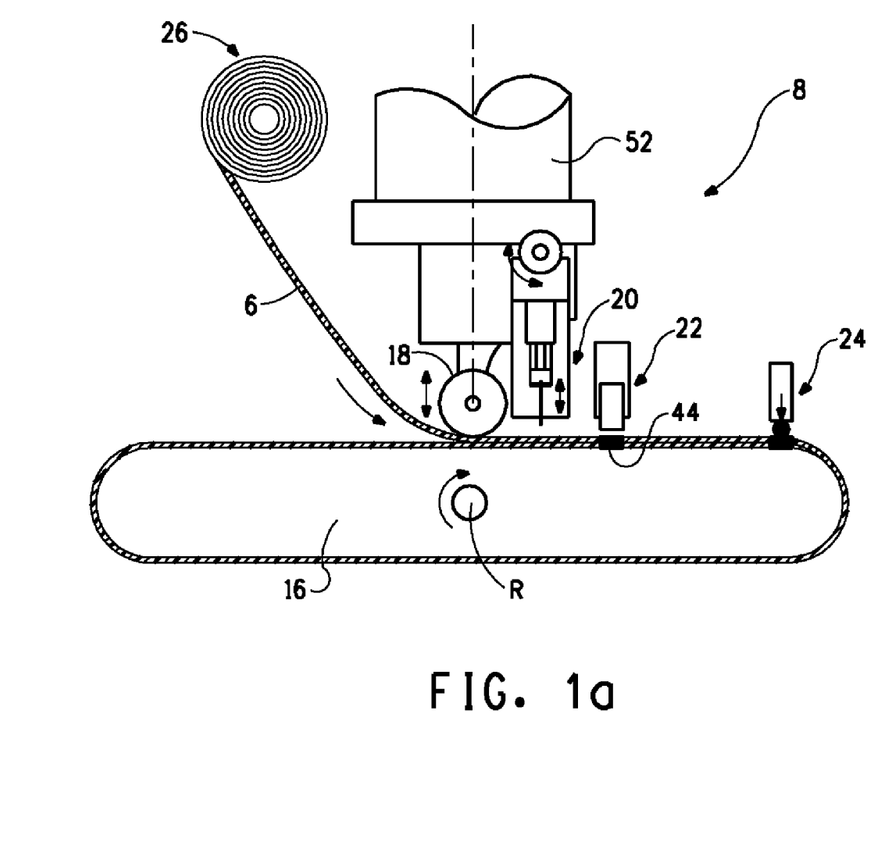
FIG. 1a is a schematic illustration of part of a tape winding robot in the process of winding cold unidirectional fibre reinforced tape (hereinafter also called "UD tape") for forming a composite article according to an embodiment of the invention.
Figure 1B:
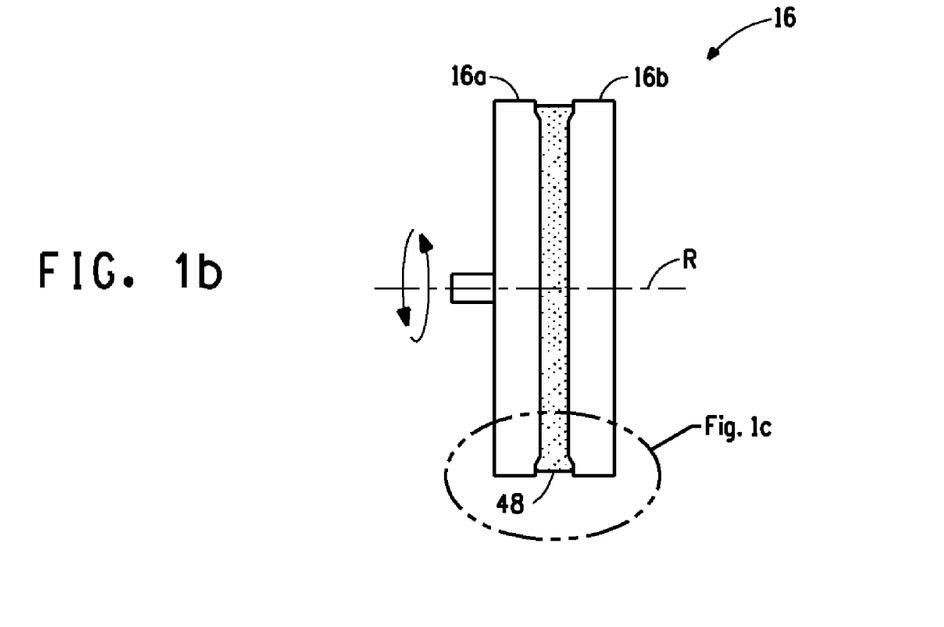
FIG. 1b is a schematic view of a jig of the robot of FIG. 1a, around which the cold UD tape is wound.

Referring now mainly to FIG. 1a, a schematic illustration of a tape winding robot 8 for winding a multilayer continuous closed loop of unidirectional fibre reinforced tape 6 is shown. The unidirectional fibre reinforced tape comprises unidirectional fibres, for instance glass fibre, carbon fibre, or other reinforcing fibres per se known in the art, embedded in a polymer resin, for instance polypropylene, polyamide, thermoplastic polyesters including polybutylene terephthalate, polyethylene terephthalate, thermoplastic elastomers, polyphenylene sulfide, and polyetherimide.

The tape may have a width in the order of magnitude of a few millimeters to a few centimeters, or even tens of centimeters, and a thickness in the order of magnitude of a tenth of a millimeter to a millimeter. The low thickness of the unidirectional tape allows the cold tape to be bent with a radius of curvature sufficiently small to be accommodated in the article to be manufactured without rupture of the tape during the winding process. For example, for 0.2 mm thick tape, minimum radiuses of curvature may be in the order of a centimeter. The term "cold" as used herein is a temperature below the melt or fusion temperature of the polymer resin of the UD tape that does not enable the layers to bond or consolidate.

The unidirectional tape may be provided on a tape reel 26 with a total wound length substantially greater than the length of the tape to be wound in a closed loop for an article, such that a large plurality of articles may be manufactured using the unidirectional tape from a single reel.

Figure 2A:
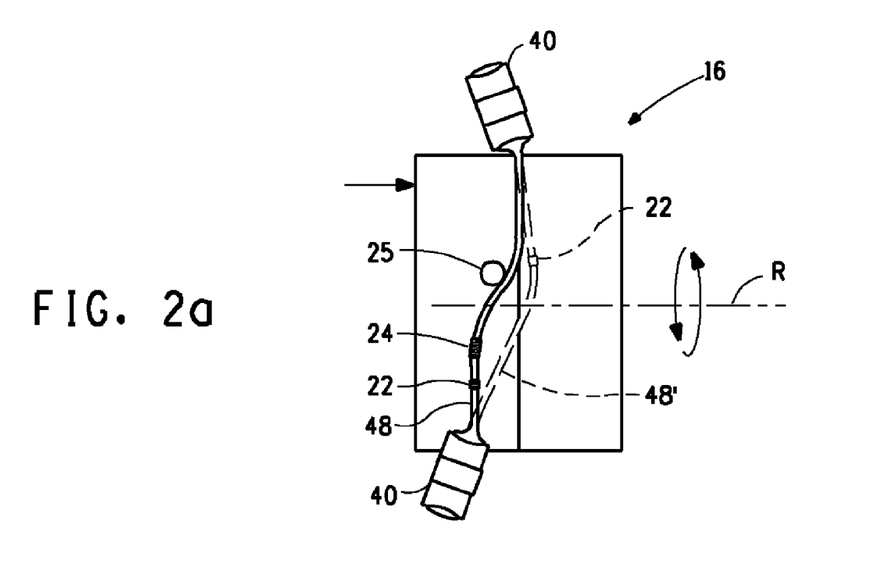
FIG. 2a is a schematic illustration of an example of a jig for a complex composite article comprising UD tape reinforcement.
Figure 2B:
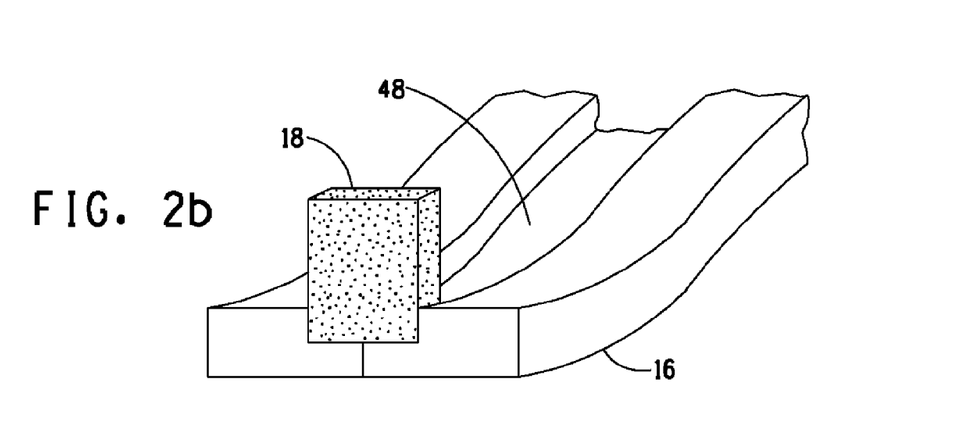
Figure 2C:
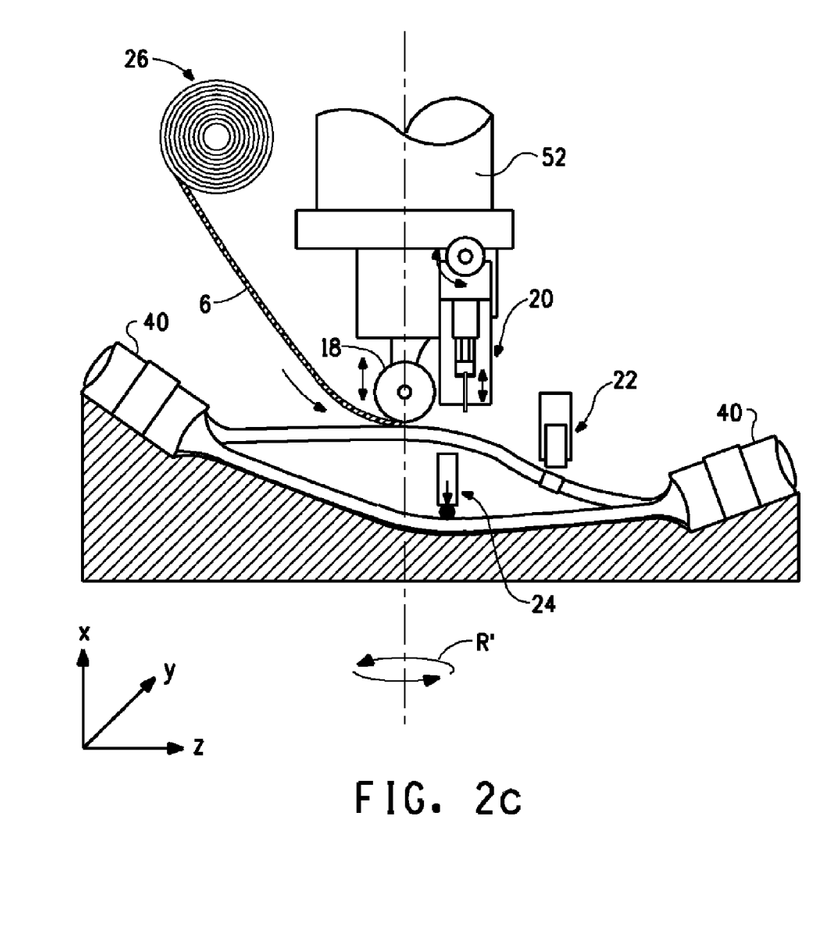
FIG. 2c is a schematic illustration of part of a tape winding robot similar to FIG. 1a, illustrating the forming of a complex composite part.
Figure 3A:
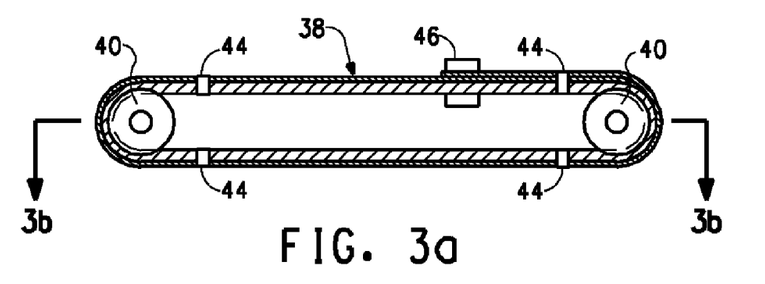
FIG. 3a is a schematic illustration of a Wound UD tape preform, including inserts, according to an exemplary embodiment of the invention, after winding but before consolidation by heat and pressure.
Figure 3B:
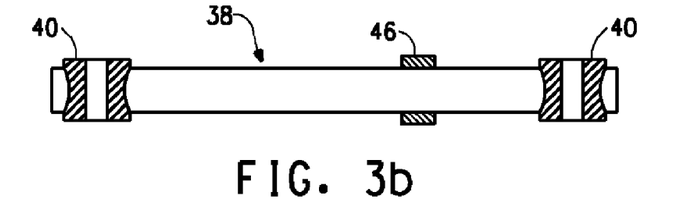
FIG. 3b is a cross-sectional view through line IIIb-IIIb.
Figure 3C:
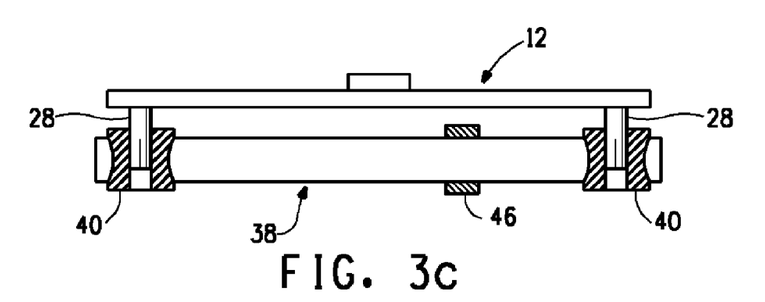
FIG. 3c is a view similar to FIG. 3b further illustrating schematically a transport mechanism for transporting the wound UD tape preform to other manufacturing stations.
Figure 3D:
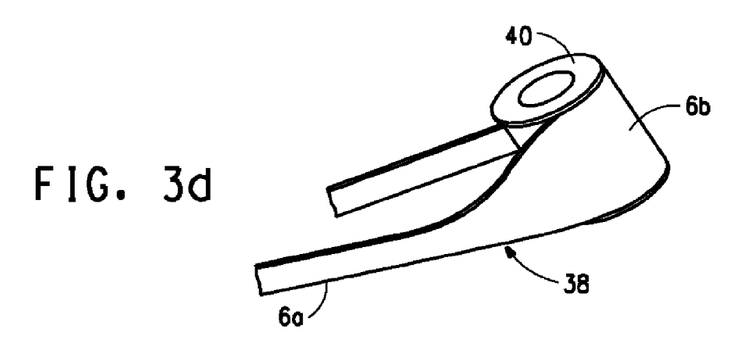

The tape winding robot 8 comprises a jig 16 around which the UD tape 6 is wound, the jig thus defining a preform of the multi-layer wound UD tape 38 prior to consolidation, the jig 16 being rotatable about an axis R relative to the tape reel 26 and robot arm 52 carrying a roller shoe 18. In the embodiment of FIG. 1a the jig 16 may be movable in a direction parallel to the axis of rotation R in order to place the tape being wound on the jig laterally, so that the subsequent layer does not fully overlap the underlying layer (i.e. is offset with respect to the underlying layer), for example to make wide sections 6b of tape or narrow sections 6a as illustrated in FIG. 3d. Optionally, the jig may be movable relative to the tape reel 26 and robot arm 52 along further axes X, Y, Z in translation and/or in rotation R', in order to enable positioning of the tape on the jig for complex forms, for instance as illustrated in FIG. 2c.

Figure 1C:
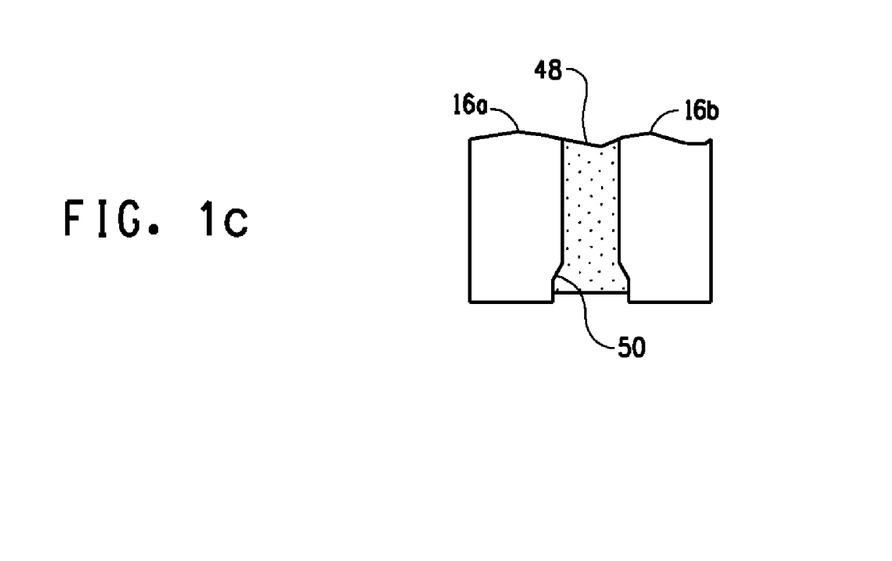
FIG. 1c is a detailed schematic view of a part of the jig of FIG. 1b.

The positioning of the tape on the jig may be defined or assisted by a tape guide channel 48, 48', whereby the jig may be made of two or more parts 16a, 16b in order to separate it from the tape winding preform 38 after completion of the winding process. The tape guide channel 48, 48' may adopt a curved three-dimensional path that surrounds the jig or is on a face of the jig to determine the shape of the wound UD tape preform 38. The jig may further comprise any necessary cavities or positioning means, for example in the form of an insert holder portion 50 (see FIG. 1c), to accommodate an insert 40 and allow the tape to be wound around the insert as may be seen in FIGS. 8a and 2a.

The tape winding robot further comprises a roller shoe 18 mounted on a robot arm 52 that is relatively movable with respect to the jig 16, the roller shoe configured to roll along and press the stacked layers of tape, as it is being wound, against the jig. The application force of the roller shoe 18 against the tape may be defined by a spring or pneumatic or hydraulic pressure defining an essentially constant rolling pressure. This pressure is provided to guide the tape on the jig 16 and is not intended to provide any consolidation of the UD material, although it may be used to compress the layers proximate the position of performing a discrete weld. The tape winding robot 8 may further comprise a movable and actionable cutter 20 to cut the end of the tape, once the winding operation is completed. In typical applications, the tape may be wound continuously without being cut to form a winding with 3 to 100 or more stacked layers of tape. Within the scope of the invention, it is possible to provide a plurality of windings each with a plurality of tape layers, the windings being separated by a cut from each other. This may be useful in embodiments with wound UD tape sections in different materials or spatially offset. It is also possible to wind two or more tapes simultaneously either one on top of the other in the same guide channel or in separate channels, or in channels that bifurcate over a portion depending on the configuration of the part to be manufactured. This may include the use of 1 or more rollers 18, cutters 20, UD tape reels 26, and welding heads 22.

Figure 4A:
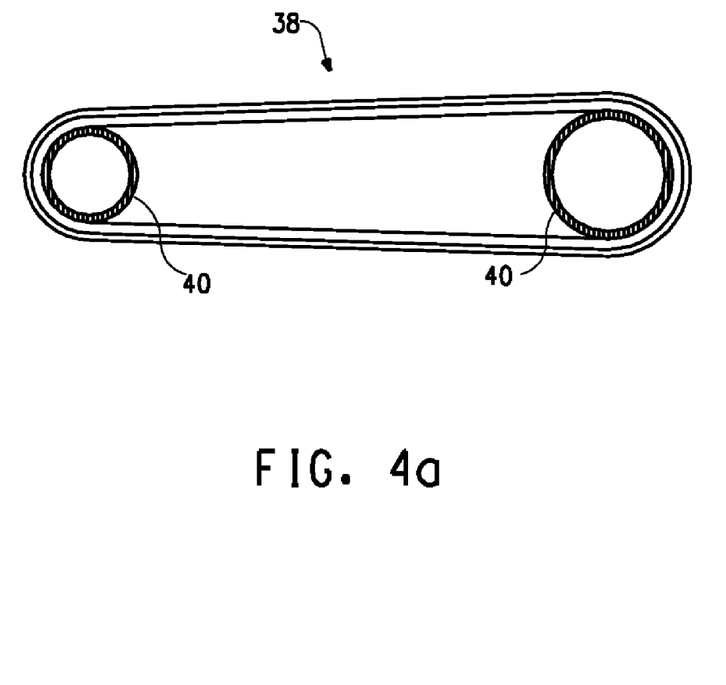
FIG. 4a is a schematic plan view of a wound UD tape preform including inserts, of another example of an article according to an embodiment of the invention.
Figure 4B:
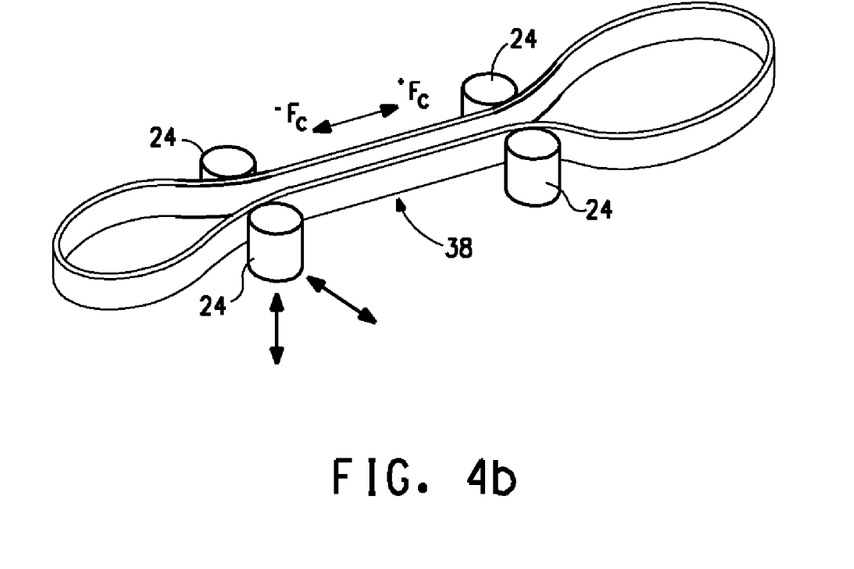
FIG. 4b is a view in perspective of a wound UD tape preform of another example of an article according to an embodiment of the invention.

In the illustration of FIG. 8a, the jig 16 is configured to form a simple elongated closed loop preform, however the jig may take various shapes, for instance a tapered shape to produce the closed loop preform of FIG. 4a, or with narrower central portions to form the preform illustrated in FIG. 4b, and many other shapes as long as the minimum radius of curvature acceptable for the bending of the tape without rupture is respected.

The jig 16 may be provided with active location devices 24, 25 that may be in the form of pins or rollers that are movable, such that as the jig passes the roller shoe 18 at the position of the active location device 24, 25, the latter is moved out of the way. A plurality of active location devices 24, 25 mounted on the jig 16 and relatively movable and actionable with respect to the jig, may be provided around the jig. Top active location devices 24 may be configured to press the stacked layers of wound tape against the jig, and side active location devices may be configured to laterally position the tape layers. The lateral positioning of tape layers may optionally be varied from layer to layer such that a lateral offset of selected certain successive layers is obtained (e.g. to widen a portion 6b of the preform relative to other portions 6b as shown in FIG. 3d).

The tape winding robot according to embodiments of this invention advantageously comprises at least one tape fixing head 22, which in an advantageous embodiment comprises a welding head 22, on a robot arm separate from the jig, or on a displacement device fixed to the jig 16. The welding head is configured to be actionable at discrete predetermined tape winding positions to press against the outer layer of tape and locally weld the outer layer of tape to the layer below, optionally to weld a plurality of layers below the welder together. The welding head may perform the discrete welding operation by ultrasonic welding, or inductive welding, by electromagnetic radiation (e.g. microwave), or by conduction heating.

In a variant, the tape fixing head may comprise an adhesive depositing injector for depositing adhesive on the tape to bond the subsequent layer to the deposit layer. The adhesive may be a snap curing adhesive, optionally UV (ultraviolet light radiation) or heat activated, whereby the tape fixing head comprises a UV or heat activation unit.

In yet another variant, the tape fixing head may comprise a mechanical stapler to fix stacked layers of UD tape together by means of a staple, for instance a metallic staple.

The tape fixing means may also comprise a combination of the above fixing means.

In an advantageous variant, the tape is welded at discrete moments after each new winding layer is placed, such that the layers are fixed together at one or more discrete positions through essentially the whole stack of tape layers. The discrete welding operations can be performed at high speed because of the very local and thus rapid heating and cooling, allowing a fast winding of the cold tape.

The tape winding robot 8 may be provided with a single welding head or two or more welding heads at different positions around the jig configured to perform discrete position welds on the stacked layers of tape at different positions simultaneously, or at different times. In an advantageous variant with a single welding head, said welding head may be configured to effect discrete welds at predetermined positions around the jig, as the jig is turned relative to robot arm 52 and roller shoe 8. The placement of welds at or near inflexion points of curves, and/or at the bottom or top of curved portions of the preform may advantageously help to stabilize and maintain the shape of the preform by preventing relative slippage of tape layers between themselves. The end of the tape after the winding operation is completed may be welded and/or clamped by an additional crimping or clamping ring or other mechanical fixing element 46 around a branch of the wound UD tape preform 38, as illustrated in FIG. 3a. Within the scope of the invention, it is possible to weld only two discrete welds at minimum, a first weld at the beginning of the winding process, and a second at the end or towards the end of the winding process. Welds can also be discretely effected every few layers of winding, for instance every three our four layers, in which case the welding process (e.g. ultrasonic welding) may be configured to penetrate through a plurality of layers, or only a single layer.

In an advantageous embodiment, welding is effected on each layer, or almost every layer, in order to rigidify the preform by coupling all the layers of the stack together.

In a variant, the composite article may comprise an insert including a shaping support structure with positioning elements that function to shape, at least in part, the wound tape positioned on the jig, but that remain integrated in the article after removal from the jig. Such a shaping support structure may be made of a polymer or of stamped and formed sheet metal or composite or other low-cost components for permanent integration within the article, in order to reduce the complexity of the jig and the active location devices and/or to enable winding a complex preform shape.

Figure 5:
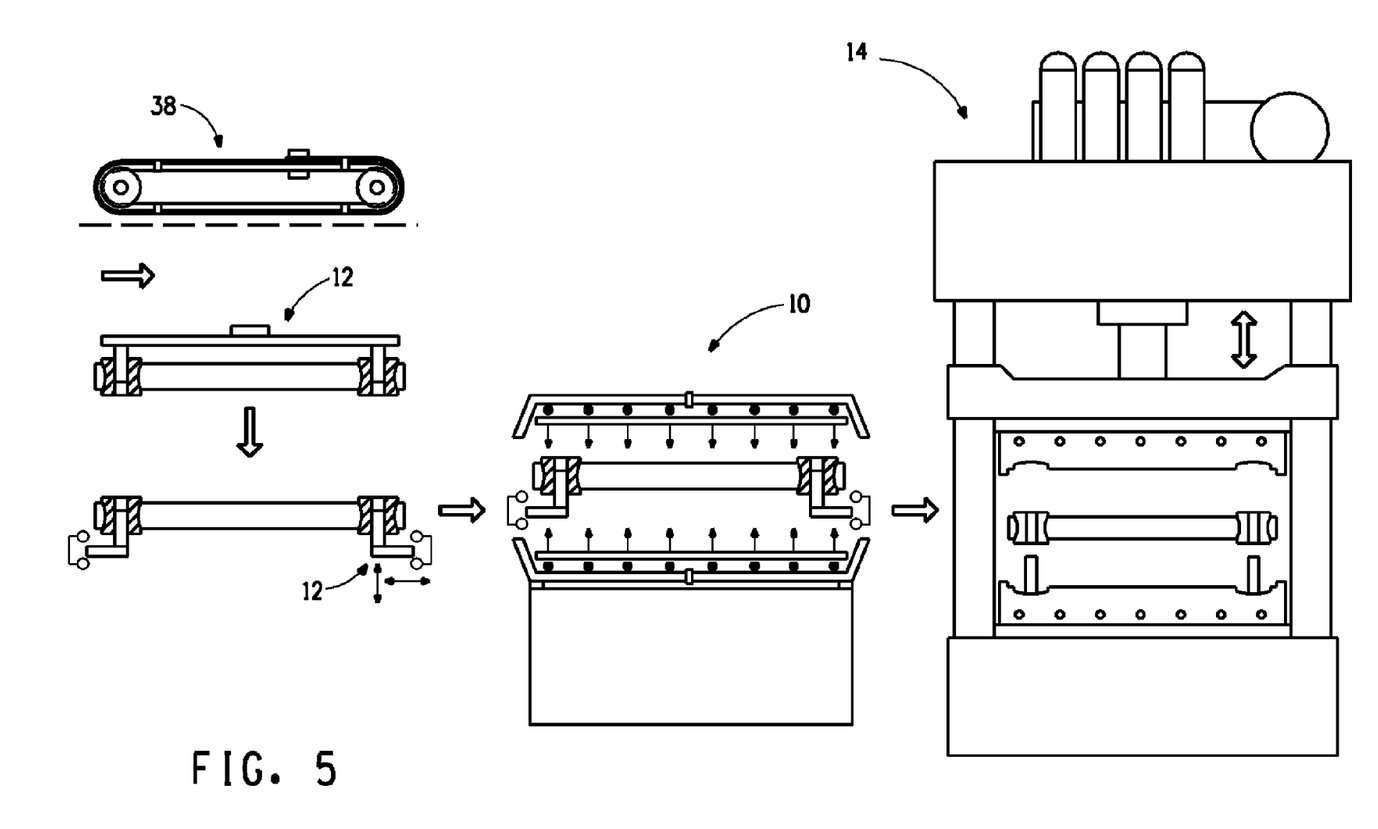
FIG. 5 is a schematic diagram illustrating certain process steps according to an embodiment of the invention.
Figure 6A:
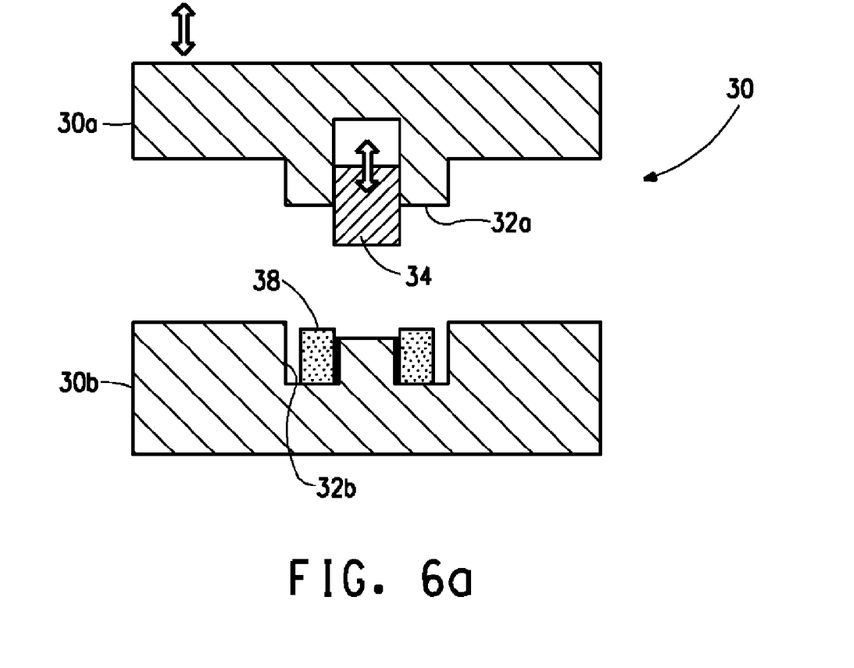
FIG. 6a is a simplified schematic illustration of a die tool for consolidation of the wound UD tape preform.
Figure 6B:
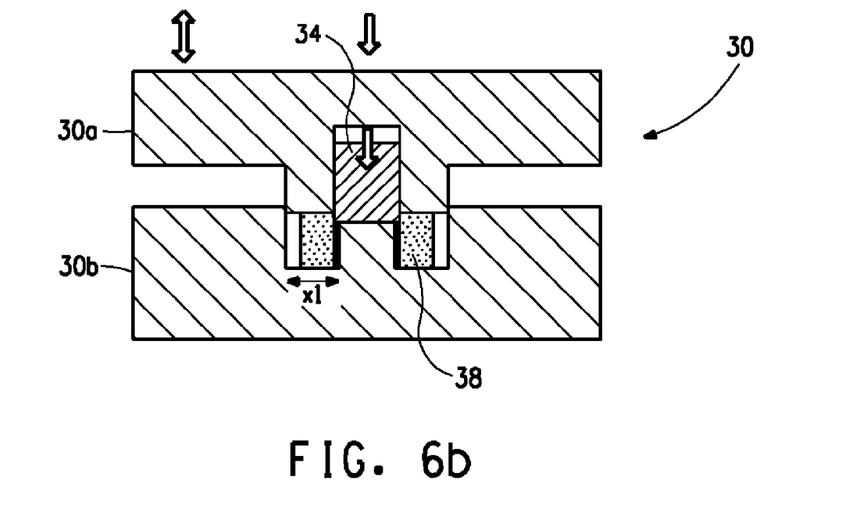
FIG. 6b is a view similar to FIG. 6a, illustrating closing of the die.
Figure 6C:
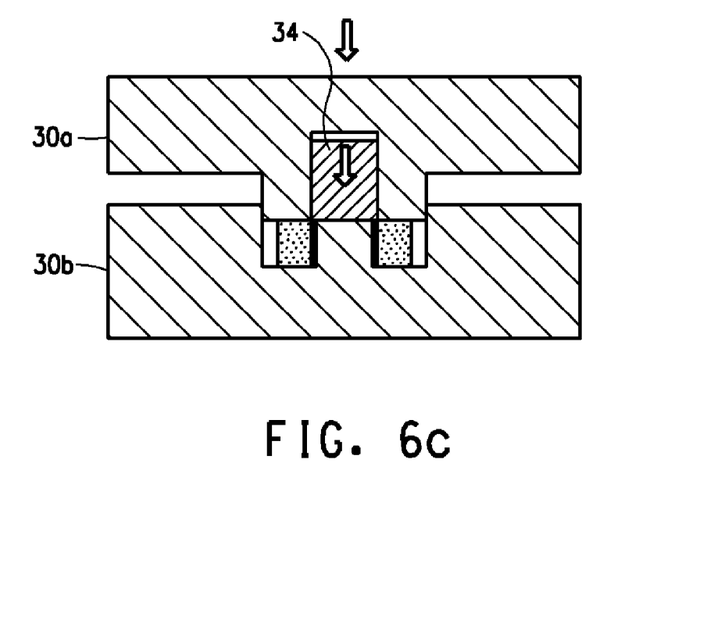
FIG. 6c is a view similar to FIG. 6b, illustrating a subsequent step of full compression of the unidirectional tape to form the article or the fibre reinforcement portion of the article.
Figure 6D:
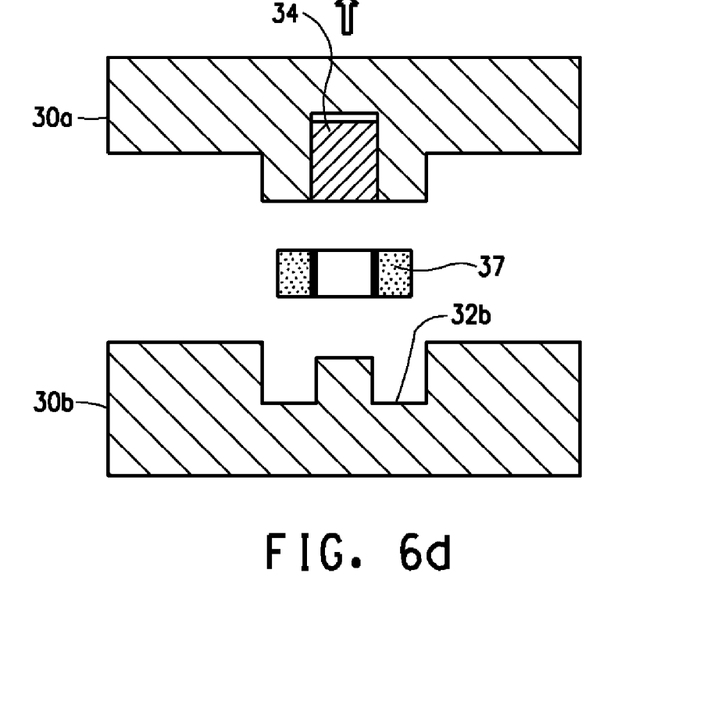
FIG. 6d is a view similar to FIG. 6c of a subsequent step, showing the opening of the die.

Referring to FIG. 5, once the wound UD tape preform 38 has been formed, it may be removed from the jig 16, and transported by a transport system 12 with the grippers 28, alternatively transported by the jig 16 itself, to a heating station 10 configured to heat the UD tape such that the polymer resin is softened and melted, but without degradation of the polymer, such that the UD tape may be consolidated. The UD tape preform may be heated by heating means including: forced hot air convection oven, infra-red oven, microwave oven, induction heating, and contact heating, combinations of these, or other heating means. The heated wound UD tape preform 38 is then transported to a mold press 14 comprising a compression tool for applying pressure on the heat softened UD tape to consolidate the tape layers and substantially remove any air or spaces between the layers.

In a variant, the UD tape preform 38 may be placed directly into an injection molding machine, optionally via a warming buffer that heats the preform close to but below the UD tape polymer melt temperature. The discrete local welding, in combination with additional stabilization of the over-molding material, gives a shear force between the different UD tape layers that prevents unravelling of the UD tape layers under load and is greater than the tractive or compressive or twisting forces that the part must meet in its use, such that full consolidation of the UD tape layers together prior to overmolding is not required, resulting in cost savings during manufacture.

In another variant, the UD tape preform 38 may be placed directly into an injection molding machine via a warming buffer that heats the preform at or above the UD tape polymer melt temperature. The over-molding polymer pressure consolidates the UD tape layers substantially bonding then together by melt fusion, resulting in near homogeneous properties in the UD tape. Consolidation prevents unravelling of the UD tape layers under load and creates a shear force resistance between the different UD tape layers that is greater than the tractive or compressive or twisting forces that the part must meet in its use. Consolidation also gives long term performance during creep and fatigue loadings.

In a first embodiment illustrated in FIG. 6a to FIG. 6d, a lower die 30b comprises a die cavity 32b configured to receiving the wound UD tape preform 38, and an upper die comprising a relatively movable active core 34 and a compression die surface 32a configured to insert into the die cavity 32b and compress the wound UD tape preform 38 in a direction essentially orthogonal to the tape stacking direction. The active core 34 presses against a central portion of the lower die to prevent polymer resin from escaping the die cavity 32b during consolidation. The resulting consolidated fiber-reinforced part 37 may be removed from the die, after some cooling, and incorporated in an injection mold for overmolding or taken to other machining stations to perform other shaping or part forming and assembly operations.

Figure 7A:
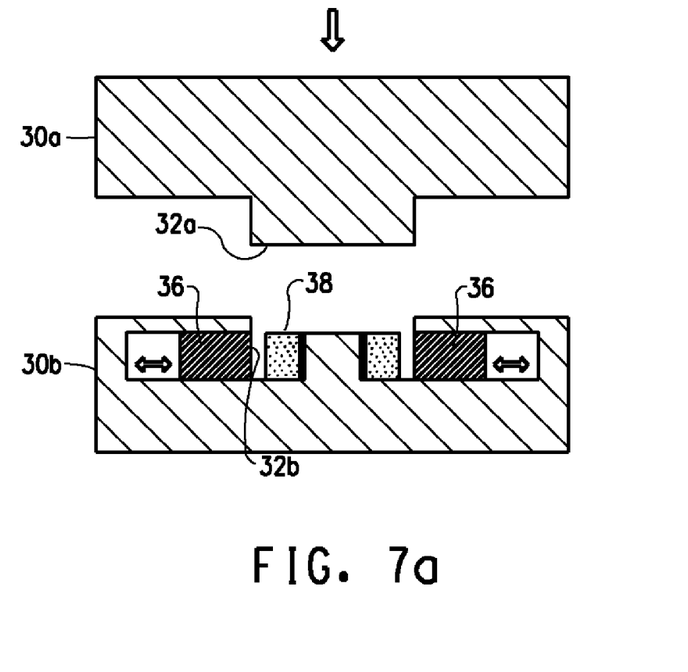
FIG. 7a is a schematic illustration comparable to FIG. 6a, but of another exemplary embodiment of a die, for compression of the wound UD tape preform in a direction orthogonal to the layers of tape.
Figure 7B:
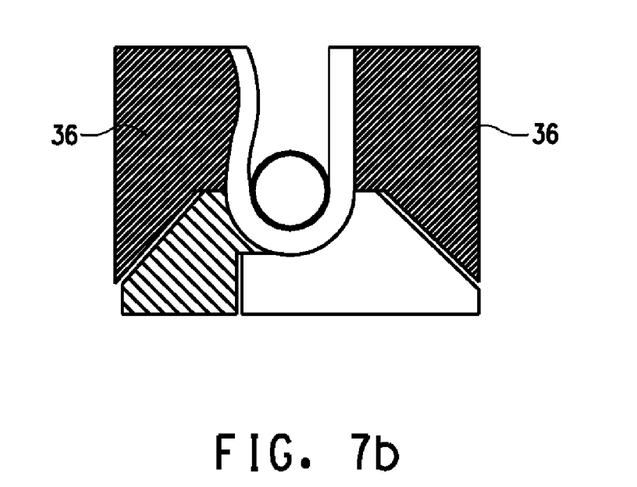
FIG. 7b is a view of a bottom die part of the die tool of FIG. 7a seen from above.
Figure 7C:
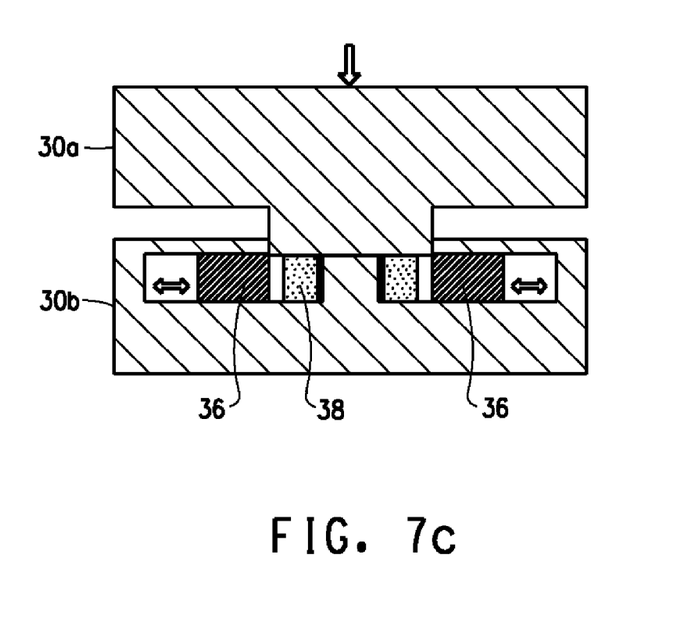
FIG. 7c to FIG. 7e are schematic illustrations similar to FIG. 7a of subsequent steps in the die movement for consolidation of the wound UD tape preform.
Figure 7D:
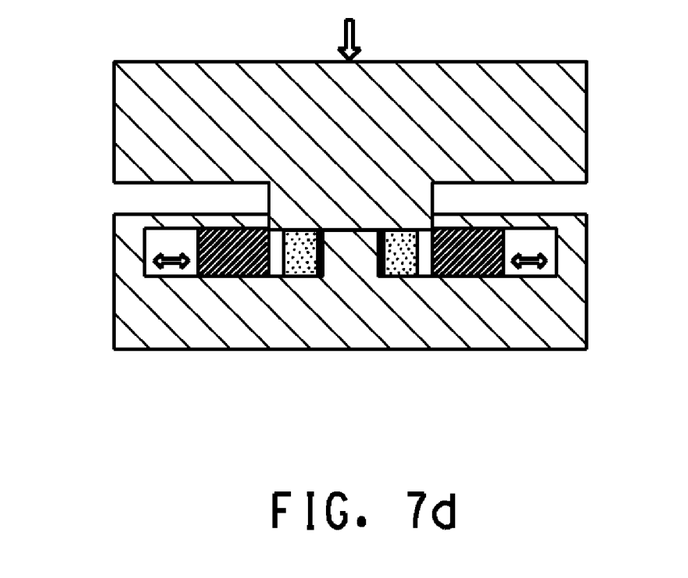
Figure 7E:
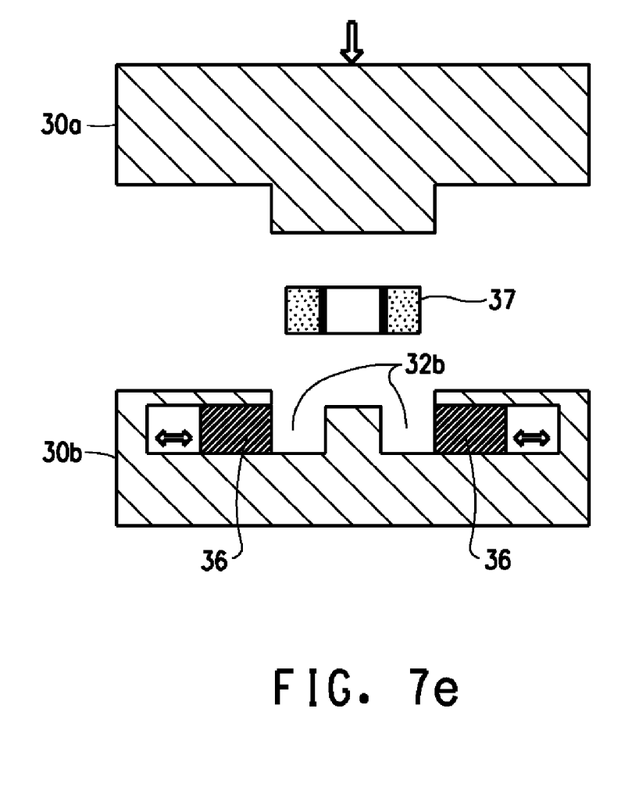

In another embodiment illustrated in FIG. 7a to FIG. 7c, the lower die 30b comprises a die cavity 32b to receive the wound UD tape preform 38 therein, the lower die having lateral active cores 36 configured to press together the tape layers in the direction of stacking of the layers. In this case, the upper die 30a can be provided without an active core and functions to close the lower die cavity 32 during the compression effected by the lateral active cores 36. The dies may be provided with temperature regulation circuits, such as fluid cooling or heating circuits therein, in order to regulate the temperature during the mold compression process, and optionally for cooling the article prior to removal from the die.

The UD tape composite structures and overmolded UD tape composite structures described herein may be used in a wide variety of applications such as for example as components for automobiles, trucks, commercial airplanes, aerospace, rail, household appliances, computer hardware, hand held devices, recreation and sports, structural component for machines, structural components for buildings, structural components for photovoltaic or wind energy equipments or structural components for mechanical devices.

Examples of automotive applications include without limitation spare wheel wells, floor pans or floor pan sections, integrated structural covers and support brackets for compressed natural gas tanks, liquid propane gas tanks, or hydrogen tanks, seating components and seating frames, engine cover brackets, engine cradles, suspension arms and cradles, chassis reinforcement, front-end modules, steering column frames, instrument panels, door systems, body panels (such as horizontal body panels and door panels), tailgates, hardtop frame structures, convertible top frame structures, roofing structures, engine covers, housings for transmission and power delivery components, oil pans, airbag housing canisters, automotive interior impact structures, engine support brackets, cross car beams, bumper beams, pedestrian safety beams, firewalls, rear parcel shelves, cross vehicle bulkheads, pressure vessels such as refrigerant bottles and fire extinguishers and truck compressed air brake system vessels, hybrid internal combustion/electric or electric vehicle battery trays, automotive suspension wishbone and control arms, suspension stabilizer links, leaf springs, vehicle wheels, recreational vehicle and motorcycle swing arms, fenders, roofing frames, and tank flaps.

Examples of household appliances include without limitation washers, dryers, refrigerators, air conditioning and heating. Examples of recreation and sports include without limitation inline-skate components, baseball bats, hockey sticks, ski and snowboard bindings, rucksack backs and frames, and bicycle frames. Examples of structural components for machines include electrical/electronic parts such as for example housings for hand held electronic devices, computers.

LIST OF REFERENCES IN THE DRAWINGS 2 manufacturing equipment
  8 tape winding robot
    16 jig
      16a, 16b jig parts
        48 tape guide channel
        50 insert holder portion
    18 roller shoe
      52 arm
    20 cutter
    22 welder
    24 top active location device—location roller
    25 side active location device—location roller
    26 tape reel
  10 heating station
  12 transport system
    28 grippers
  14 mold press
    30 compression mold die
      30a upper die
        32a die cavity counterpart
        34 active core
      30b lower die
        32b die cavity
        36 lateral active cores
4 article
  37 consolidated fibre reinforced part
  38 wound UD tape preform
    44 discrete welds
    46 fixing element—clasp
  40 inserts
  42 overmolding
6 unidirectional tape
  6a narrow (aligned) stacked layer portion
  6b wide (offset) stacked layer portion

What is claimed is:

1. A method of forming an article from a unidirectional (UD) tape having a thickness of 0.1 mm to 1 mm and comprising a continuous unidirectional fibre impregnated with a thermoplastic polymer resin, the method comprising:
winding a continuous section of cold said UD tape to form a closed loop wound UD tape preform comprising a plurality of stacked UD tape layers of said continuous section of cold UD tape;
during winding, fixing directly together in at least one discrete position at least two adjacent stacked UD tape layers at or near an end of the winding and optionally at one or more other levels of the plurality of stacked UD tape layers; and consolidating the wound UD tape preform.

2. The method according to claim 1 wherein said fixing directly together includes adhesive bonding or welding, including welding by ultrasonic or inductive means.

3. The method according to claim 1, wherein said consolidating the wound UD tape preform comprises: heating and applying pressure in a compression die to consolidate the plurality of stacked UD tape layers, or heating and overmolding the wound UD tape preform.

4. The method according to claim 1, said method comprising: during the winding step, fixing directly together in at least one discrete position at least two adjacent stacked layers of UD tape at or near a beginning of the winding.

5. The method according to claim 1, said method comprising, fixing directly together in at least one discrete position a further plurality of adjacent stacked layers of UD tape in a middle portion of the winding between a beginning and an end of the winding.

6. The method according to claim 1, said method comprising, fixing directly together in at least one discrete position most or all adjacent stacked layers of UD tape to each other.

7. The method according to claim 1, said method comprising, fixing directly together in at least one discrete position adjacent stacked layers of UD tape at different positions along the closed loop.

8. The method according to claim 1, wherein said UD tape is wound around a jig comprising a channel to guide the tape.

9. The method according to claim 1, wherein said UD tape is wound around a jig comprising at least two separable parts configured to allow the UD tape preform to be removed from the jig after winding.

10. The method according to claim 1 wherein said UD tape is wound around a jig comprising top active location pins that press the UD tape down against the jig.

11. The method according to claim 1, wherein said UD tape is wound around a jig comprising side active location pins that press the UD tape laterally in a direction essentially parallel to a plane of the UD tape.

12. The method according to claim 1, wherein said UD tape is wound in a manner to offset laterally certain sections of UD tape with respect to an underlying section of UD tape.

13. The method according to claim 1, wherein said UD tape is stored in a roll and fed from the roll during the winding process and wherein the UD tape is made from sheets of unidirectional fibre impregnated with polymer resin having a thickness between 0.1 and 0.5 mm, and cut in a direction of the fibre to widths of UD tape of 0.5 to 5 cm width.

14. The method according to claim 1, wherein the winding forms a plurality of stacked layers in a range of 3 to 100 layers.

15. The method according to claim 1, wherein the consolidation comprises heating the UD tape preform in a heating station to a resin softening temperature enabling consolidation, and subsequently transferring the heated UD tape preform to a compression mold die to apply pressure.

16. The method according to claim 15 wherein said compression mold die comprises a lower die comprising a die cavity for receiving the UD tape preform therein, the lower die comprising lateral active cores configured to compress the UD tape preform in a direction essentially parallel to a stacking direction of layers.

17. The method according to claim 15 wherein said compression mold die comprises a lower die comprising a die cavity for receiving the UD tape preform therein, and a upper die comprising an active core, the upper die configured to compress the UD tape preform in a direction essentially orthogonal to a stacking direction of the layers.

18. The method according to claim 1, further comprising overmolding at least a portion of the consolidated UD tape preform after consolidation.

\* \* \* \* \*